Dec. 24, 1963 W. J. HORGAN, JR 3,114,944
DOOR ASSEMBLY
Filed Dec. 26, 1961 6 Sheets-Sheet 1

INVENTOR.
WILLIAM J. HORGAN, JR.
BY Oscar L. Spencer

INVENTOR.
WILLIAM J. HORGAN, JR.
BY Oscar L. Spencer

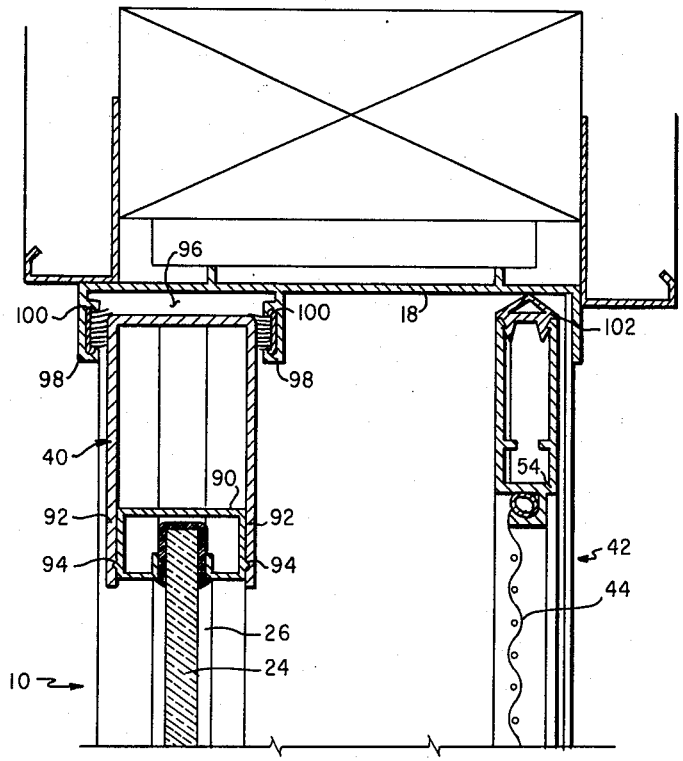
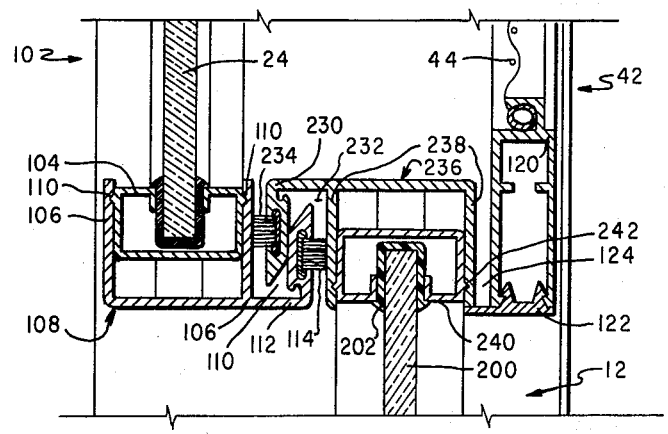

Dec. 24, 1963     W. J. HORGAN, JR     3,114,944
DOOR ASSEMBLY
Filed Dec. 26, 1961     6 Sheets-Sheet 4
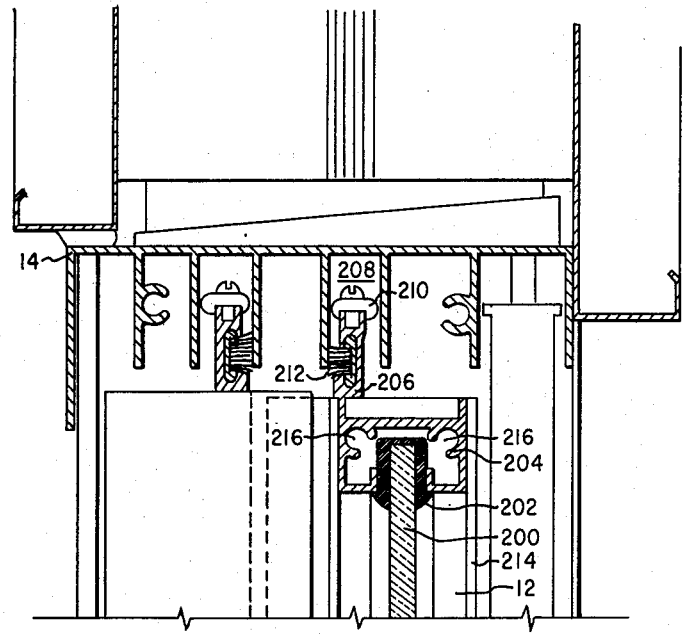
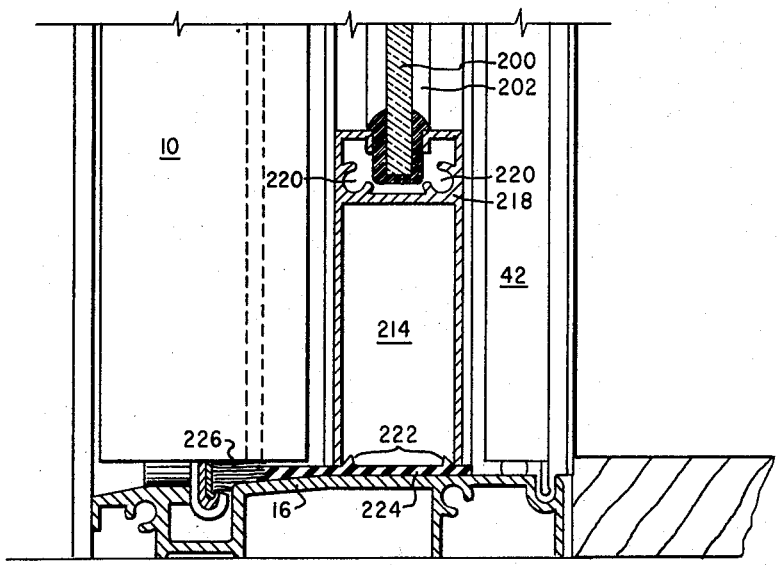
INVENTOR.
WILLIAM J. HORGAN, JR.

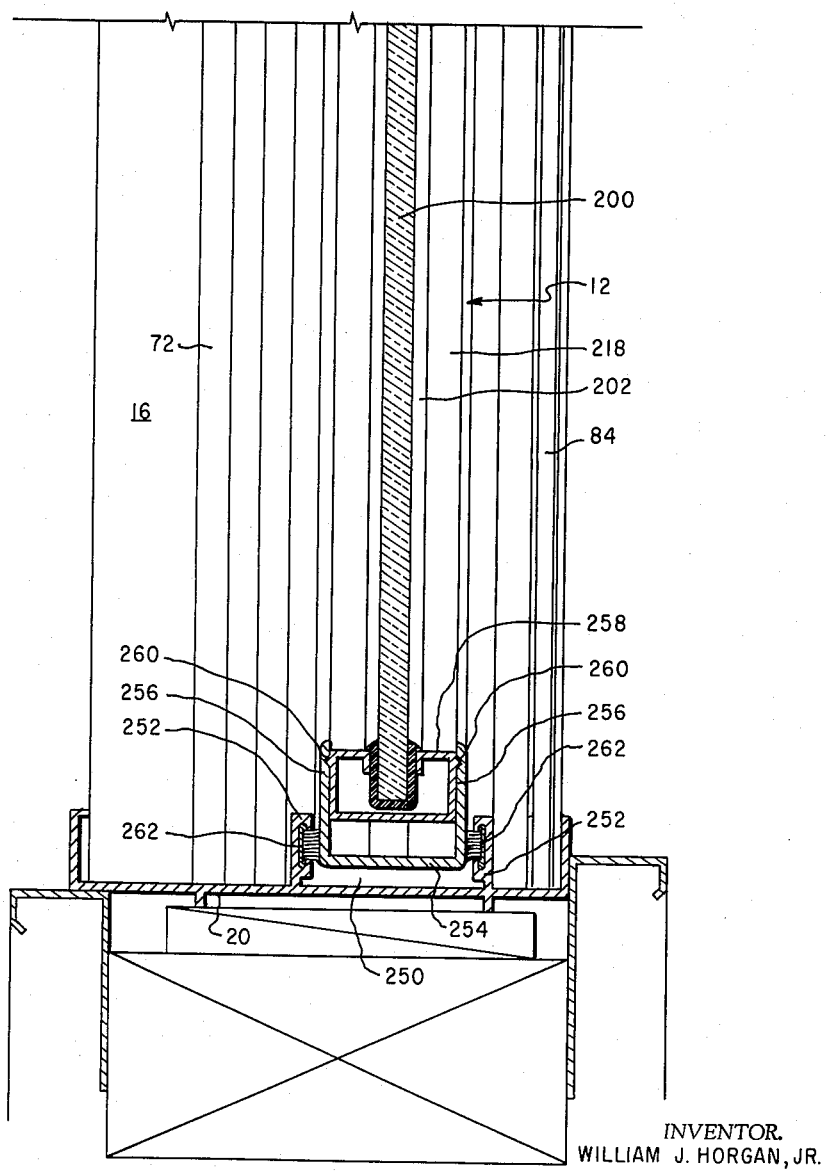

Dec. 24, 1963 W. J. HORGAN, JR 3,114,944
DOOR ASSEMBLY
Filed Dec. 26, 1961 6 Sheets-Sheet 6
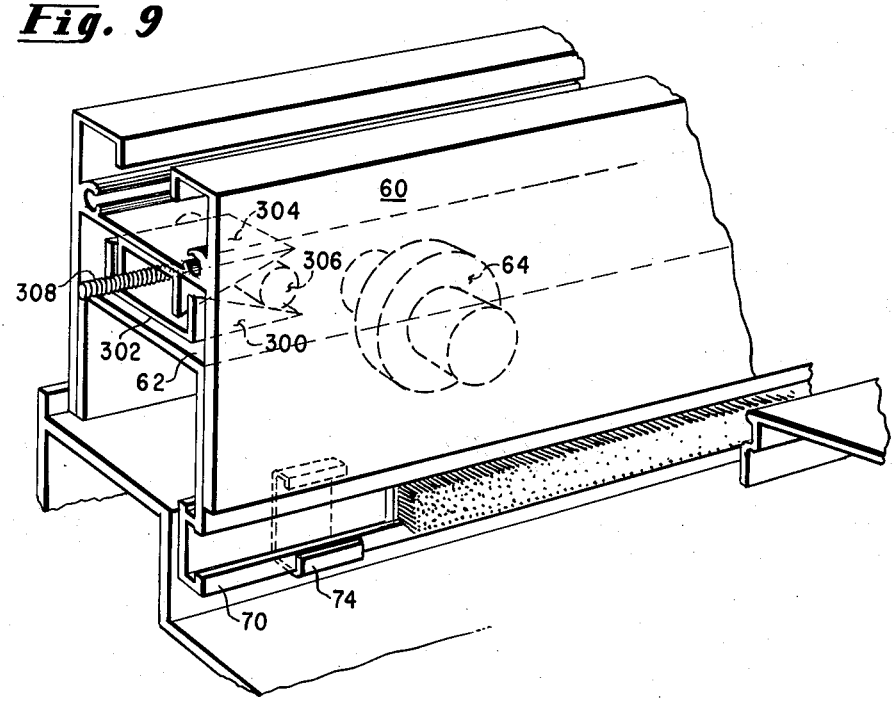
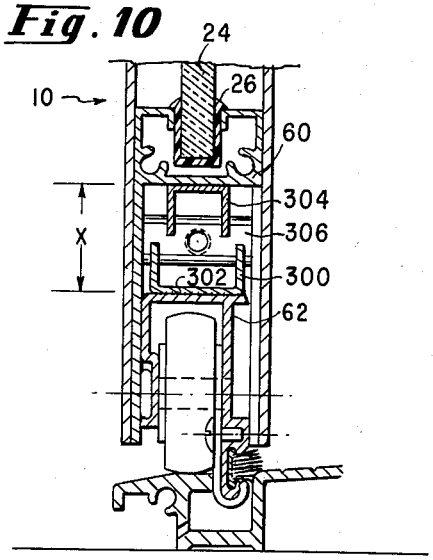
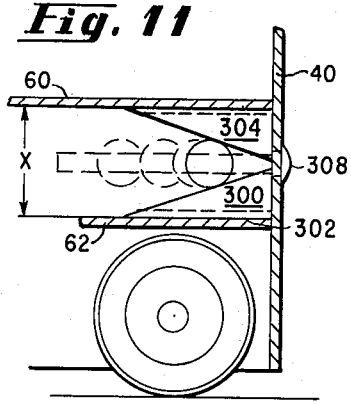
INVENTOR.
WILLIAM J. HORGAN, JR.
BY Oscar L. Spencer

United States Patent Office 3,114,944
Patented Dec. 24, 1963

3,114,944
DOOR ASSEMBLY
William J. Horgan, Jr., Pittsburgh, Pa., assignor to Pittsburgh Plate Glass Company, Pittsburgh, Pa., a corporation of Pennsylvania
Filed Dec. 26, 1961, Ser. No. 162,177
1 Claim. (Cl. 20—19)

This relates to an improved door assembly, and in particular to a glass door assembly having a plurality of panels, at least one of which panels is slidable.

The sliding glass door assembly of the present invention is possessed of extremely slim lines, is of sturdy construction, is thoroughly weather sealed, and is so designed as to have a flat threshold or sill, free of the upstanding rib-type runners found in prior sliding door assemblies.

In addition to the above, the sliding panel or panels of the present invention are easily adjusted to align the meeting door stiles and to insure an aligned fitting between the lock stile of the sliding panel and its corresponding jamb.

The present invention will be better understood when reference is had to the accompanying drawing, wherein:

FIGURE 4 is a cross-section taken along line 4 of FIGURE 1;

FIGURE 5 is a cross-section taken along line 5 of FIGURE 1;

FIGURE 6 is a cross-section taken along line 6 of FIGURE 1;

FIGURE 7 is a cross-section taken along line 7 of FIGURE 1;

FIGURE 8 is a cross-section taken along line 8 of FIGURE 1;

Figure 15:
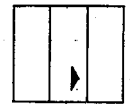
Figure 12:
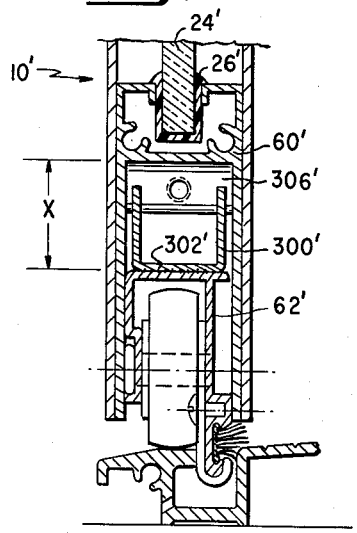
Figure 13:
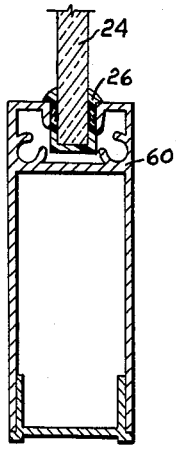
Figure 14:
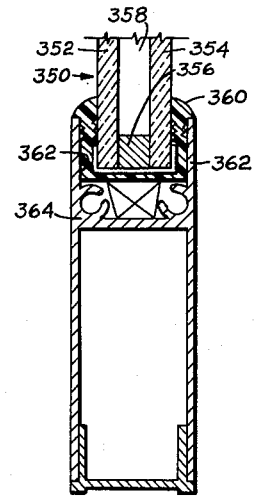
Figure 2:
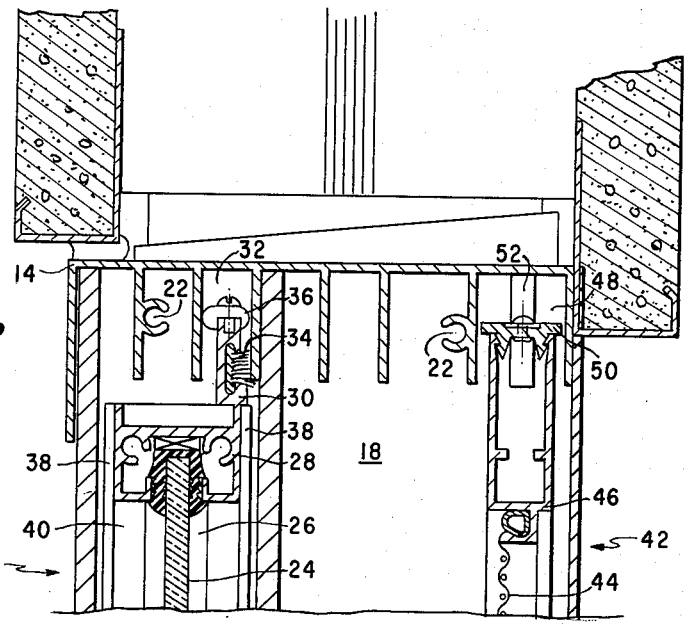
FIGURE 2 is a cross-section taken along line 2 of FIGURE 1.

FIGURES 9, 10, and 11 show different views of one embodiment of the aligning device of the present invention;

FIGURE 12 shows a second embodiment of the aligning device of the present invention;

FIGURE 13 is a close-up of the bottom rail and glazing gasket for a single glazed unit;

FIGURE 14 shows a modified bottom rail and glazing gasket assembly for a double glazed unit;

FIGURE 15 shows schematically a three-panel unit of the present invention; and

Figure 16:
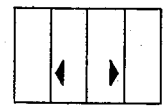

FIGURE 16 shows schematically a four-panel unit of the present invention.

Figure 1:
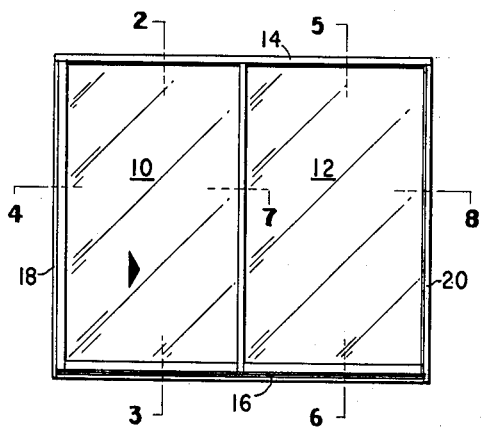
FIGURE 1 is an outside elevation view of a two-panel sliding glass door of the present invention.

FIGURE 1 depicts an outside elevation view of a two-panel sliding glass door of the present invention. The sliding panel 10 and the fixed panel 12 are mounted within an assembly frame comprising a header 14, threshold or sill 16, and jambs 18 and 20.

The header 14 constitutes a wide channel extending its full length and includes therein a plurality of smaller channels. Circular receptacles 22 receive screws extended through jamb 18, thereby securing the header 14 to the jamb 18.

The glass plate 24 of sliding panel 10 is surrounded by gasket 26. The top portion of glass plate 24, i.e. its upper gasketed edge, is inserted within top rail 28 which has an extending arm 30 protruding into channel 32 of the header 14. Arm 30 supports weather stripping material 34, such as wool pile, the entire length of the sliding panel 10. Mounted on top of the extending arm 30 of top rail 28 is the top rail guide 36 which communicates tightly with the side walls of channel 32. The top rail 28 is held within the arms 38 of the lock stile 40 which provides the vertical support for the glass plate 24. The sliding glass panel 10 is located on the exterior side of header 14 while on the interior side a sliding screen panel 42 is provided.

The screen material 44, such as a fiber glass screen, is supported at its top by screen top rail 46. Screen top rail 46 protrudes into the interiorly extreme channel 48 of header 14. Screen top rail guide 50 is in close physical contact with the side walls of the channel 48 of header 14, while spring guide 52 applies a downward force on screen panel 42 and tends to restrict vertical movement thereof. The screen top rail 46, and thus the screen material 44, is supported in the vertical direction by screen stile 54.

Figure 3:
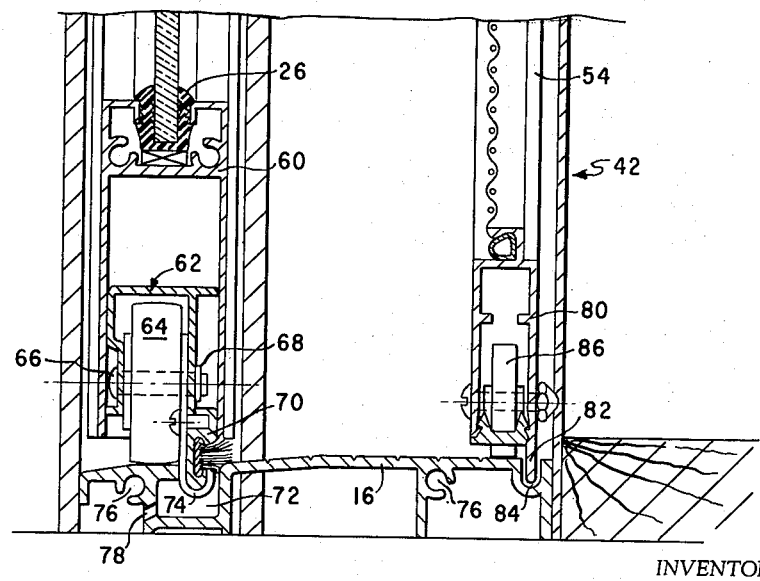
FIGURE 3 is a cross-section taken along line 3 of FIGURE 1.

The bottom portion of the sliding glass panel 10 and the sliding screen panels 42 are depicted in FIGURE 3. The bottom portion of glass plate 24 is, of course, also mounted within gasket 26. The gasketed glass plate 24 is mounted within bottom rail 60. The bottom portion of rail 60 is hollowed out to receive wheel housing 62 in which is mounted the door wheel 64 secured to the housing 62 by means of axle screw 66 and axle nut 68. The wheel housing 62 has a lower portion 70 which extends into opening 72 of the threshold or sill 16 and holds weather stripping material the entire length of the sliding door assembly. Bottom rail guide 74 surrounds the lower portion 70 and provides a reasonably tight fit between itself and the side walls of opening 72.

The threshold 16 is virtually a planar surface, absent of any extending rib type structures. In addition to opening 72, the threshold includes circular receptacles 76 which receive screws extended through jamb 18 to secure the jamb to the bottom sill. Weep holes 78 are provided to communicate the exterior atmosphere with the opening 72 thereby providing exit passages for any water or other fluid material which may tend to collect in outer channel opening 72.

The bottom portion of the sliding screen assembly 42 is supported by a screen bottom rail 80 which has an arm 82 serving as its screen bottom rail guide and extending into opening 84 of the sill 16. Screen wheel 86 is secured within the screen bottom rail 80 and provides rolling contact of the screen assembly 42 and the threshold 16.

The section of the sliding panel 10 depicted in FIGURE 4 reveals that the gasketed side edge of glass plate 24 is inserted within the opening of the single glazed adapter 90. The single glazed adapter in turn fits between the extending arms 92 of the lock stile 40, and is secured therein by means of the rib arrangement 94. The stile 40 is slidably insertable into the channel 96 of jamb 18, which is defined by extending arms 98. Secured within the arms 98 are lengths of weather stripping material 100 which guarantee a water tight seal when the stile 40 is inserted within the channel 96.

The slideable screen 42 has its screening element 44 supported by the vertical screen stile 54. Screen bumper 102, made of a rubbery material, is inserted within the edge of stile 54 and abuts the end wall of jamb 18 when the screen is in the position shown in FIGURE 4.

As can be seen in FIGURE 5, the configuration of the top portion of the stationary panel 12 is quite similar to that of the sliding panel 10. The glass plate 200 of the stationary panel 12 is surrounded by a gasket 202 similar to the gasket 26 surrounding the sliding plate 24. Top rail 204 surrounds the top edge of plate 200 and has an arm 206 extending upwardly and into channel 208 of the header 14. A top of arm 206 is a top rail guide 210 which fits snugly between the side walls of channel 208. Lengths of weather stripping material 212 are fixed in the arm 206 and engage the exterior side wall of channel 208. The top rail 204 is secured to the fixed door stile 214 by virtue of screws (not shown) which pass through the stile 214 and communicate with circular apertures 216.

The bottom portion of glass plate 200 of the fixed panel 12 is also enclosed within a portion of gasket 202. The gasketed glass is wedged between the opening of bottom rail 218. Bottom rail 218 has apertures 220 therein which receive screws (not shown) inserted through the end wall of stile 214 to secure the bottom rail 218 to the stile 214. The bottom rail 218 is wedged over the protruding elements 222 of the fixed base plate 224. The fixed base plate 224 is secured to the sill 16 and has weather stripping material 226 on the exterior side thereof which tends to further weather seal the unit.

The interlocking portion of the sliding glass door assembly of the present invention is viewed in FIGURE 7. The gasketed glass plate 24 of the sliding panel 10 is inserted into the single glazed adapter 104. The single glazed adapter 104, now holding the glass plate 24, is inserted within the arms 106 of the interlocking stile 108 and retained therein by the rib arrangement 110. Interlocking stile 108 has an L-shaped arm 112 which, in addition to holding the length of weather stripping material 114, defines an opening 116.

Slideably engageable within the opening 116 is a corresponding L-shaped arm 230 of the fixed panel 12 which receives the arm 112 within its own opening 232. Arm 230 also supports and secures a length of weather stripping material 234. The arm 230 is a portion of the fixed interlocking stile 236 of the fixed panel 12. Inserted within the arms 238 of this stile is the single glazed adapter for the fixed panel 240, which is secured therein by means of a ribbed arrangement 242. The glass plate 200 is surrounded by a gasket 202 before insertion within adapter 240.

The screen stile 120, which supports the screen 44 of the sliding screen panel 42 adjacent the fixed interlocking stile 236, has an insect seal 122 inserted therein and extending beyond the surface of the stile 120 and abutting against arm 238 of the fixed interlocking stile 236, thereby sealing the gap 124. The seal 122 is preferably composed of a rubber-like material to insure good sealing action.

The jamb 20, as is best seen in FIGURE 8, is provided with a channel 250 defined by protruding arms 252. Fixedly inserted within this channel is the fixed door stile 254 of the fixed panel 12. Inserted within the arms 256 of stile 254 is a single glazed adapter 258 which is secured therein by means of the rib arrangement 260. Gasket 202 surrounds the glass plate 200 and provides a seal between the glass plate 200 and the adapter 258 when the glass is inserted therein. Lengths of weather stripping material 262 are secured within the arms 252 of the jamb 20 and provide a weather tight seal between the jamb and the fixed door stile 254.

FIGURES 9, 10, and 11 show cumulatively different views of a single one of the longitudinal extremities of the bottom rail portion of the sliding panel 10. Included within this portion of the bottom rail is a means to adjust the elevation of the sliding glass panel 10 by lifting or lowering the entire glass plate 24 as it is supported in the bottom rail 60. A channel structure 300, whose extending legs define an inclined slope cam surface, has its base 302 secured to the wheel housing 62 as by welding. An additional channel member 304 whose protruding legs define an inclined surface, is mounted inversely to the aforesaid inclined surfaced channel member 300 and is secured to the under surface of the bottom rail 60 by welding. The cam follower adjustment bar 306, having a screw thread therein, is positioned between the inclined surfaces. Screw 308 is engaged within the threaded opening of adjustment bar 306 so that as the screw 308 is rotated, the threaded bar 306 travels in or out between the two defined channels 300 and 304, thereby increasing or decreasing the dimension X, thereby raising or lowering the bottom rail 60. A similar adjustment mechanism is located at the other extremity of the bottom rail 60 of the sliding panel 10. By adjusting the screw 308, the door may be properly aligned to form an intimate engagement between the jambs and the door stiles.

FIGURE 12 shows a second embodiment of means to adjust the elevation of the sliding glass panel 10′ by lifting or lowering the entire glass plate 24′ as it is supported in the bottom rail 60′. A channel structure 300′, whose extending legs define an inclined slope cam surface, has its base 302′ secured to the wheel housing 62′ as by welding. The cam follower adjustment bar 306′, having a screw thread therein, is positioned between the inclined surface of channel 300′ and the under surface of the bottom rail 60′. The bottom rail 60′ then rests directly upon adjustment bar 306′. Screw 308′ is engaged within the threaded opening of adjustment bar 306′ so that, as the screw 308′ is rotated, the threaded bar 306′ travels up or down the inclined surface of channel 300′, thereby increasing or decreasing the dimension X′, thereby raising or lowering the bottom rail 60′.

The sliding door assembly just described is a single glazed unit comprising one sliding panel and one fixed panel. However it must be understood, and it is in fact preferred, that a double glazed unit could be used in place of a single glazed unit. A portion of a typical double glazed unit is shown in FIGURE 14. Therein, a bottom rail receives a double glazed unit 350 comprising glass panels 352 and 354 with an appropriate insert 356 to hermetically seal the enclosed space 358. The double glazed unit is inserted in the gasket 360 and then between the side walls 362 of the bottom rail 364. The bottom rail 364 shown in FIGURE 14 is for a double glazed unit. The top rails of both the fixed and sliding panels must be similarly enlarged to receive the double glazed unit. The separate stiles however may be adapted to receive the double glazed unit simply by removing the individual single glazed adapters. When the single glazed adapters are removed the opening between the side walls of the disclosed stiles is sufficiently large to receive the double glazed unit 350.

In addition to providing a two panel unit as has been herein above described, such sliding glass doors may also be arranged in a three panel unit as depicted in FIGURE 15 or in a four panel unit as depicted in FIGURE 16. In FIGURES 15 and 16, the doors which are preferably the sliding panels are indicated with an arrowhead, the direction of the arrowhead indicating the direction in which the doors are to move.

I claim:

A sliding door assembly comprising:
A. a door frame having a sill,
B. a door panel slidably mounted in said frame, said panel having a bottom rail,
C. a weather seal slidably contacting said sill along the full length of said rail,
D. means mounting said seal for sliding along said sill in fixed vertical relationship thereto, comprising:
 (1) an elongate combined weather seal support and wheel housing member extending substantially the full length of said rail, said seal being mounted on said member,
 (2) wheels mounted on said member
 and resting on said sill for rolling therealong, and
E. adjustable support means, one at each end of said rail, supporting it on said member for vertical adjustment relative thereto.

References Cited in the file of this patent

UNITED STATES PATENTS

| | | |
|---|---|---|
| 257,401 | Somers | May 2, 1882 |
| 2,931,434 | Steel | Apr. 5, 1960 |